UNITED STATES PATENT OFFICE.

CHARLES WATT AND HUGH BURGESS, OF LONDON, ENGLAND.

IMPROVEMENT IN THE MANUFACTURE OF PAPER FROM WOOD.

Specification forming part of Letters Patent No. 11,343, dated July 18, 1854.

*To all whom it may concern:*

Be it known that we, CHARLES WATT, of the city of London, in the county of Middlesex, and HUGH BURGESS, of the city of London, in the county of Middlesex, and Kingdom of Great Britain, have invented, made, and applied to use certain Improvements in Pulping and Disintegrating Vegetable Substances, for which Letters Patent have been granted to us by Her Majesty the Queen of Great Britain, bearing date the 19th day of August, 1853; and we do hereby declare that the following specification (being the same on which Letters Patent were granted) is a full, clear, and exact description of the same.

The wood or vegetable substances upon which it is intended to operate by this process should first be reduced to very fine shavings or cuttings—the finer the better. This may be done in any suitable machine. The shavings are then to be boiled in a solution of caustic alkali, the strength of which, being dependent on the nature of the vegetable substance operated on, can only be learned by experience. For deal or fir wood we find that a solution of alkali of the strength indicated by 12° of the English hydrometer answers very well. The length of time necessary for this part of the process is somewhat dependent on the nature of the vegetable substance to be treated. We find boiling in a solution of caustic alkali under pressure of considerable service. We do not claim this operation as a part of our invention. The shavings are then to be well washed and pressed, and the washings may be saved and evaporated down and burned in a suitable furnace, when they are again available for the same purpose. The damp shavings are now to be exposed to the action of chlorine, or the compounds of chlorine with oxygen, till, on a portion being placed in a dilute solution of caustic alkali, the vegetable substance falls into a dark pulpy mass. This part of the process is conveniently effected by placing the damp shavings on racks or drawers about nine inches apart, one above another, arranged in a chamber, and allowing the chlorine, or the compounds of chlorine with oxygen, to enter the chamber and fill it. Of the compounds of chlorine with oxygen, we prefer that known as protoxide of chlorine, or hypochlorous or chlorous acid, or euchlorine.

If found more convenient, the chlorine, or the compounds of chlorine with oxygen, may be used in aqueous solution instead of the gaseous form.

As soon as the shavings have been sufficiently acted upon by the gas, as may be ascertained by the method above described, they may be removed and the hydrochloric acid, which is the result of the above process, removed by washing, and the shavings well pressed. This should be done with as little water as possible, as this acid may be saved and made use of for the reproduction of chlorine. The shavings are now to be placed in a weak solution of caustic alkali, when they will fall into a pulpy mass of a dark-brown color. This part of the process may be expedited by exposing the mass to the action of a beater or "engine" placed in the tank containing the solution of alkali.

The pulp obtained as above described, having been freed from the alkali by washing, (which may be saved as before directed,) may now be bleached by the usual process, or, as we prefer, by chloride or hydrochloride of soda or potash, liberating the chlorous or hypochlorous acid by hydrochloric acid.

Having thus fully described the nature of our invention and shown how the same may be reduced to practice, we wish it to be distinctly understood that we do not confine our claim to the apparatus or utensils or the manipulations herein named, as they may be varied to suit the circumstances of the case; but

What we do claim as of our invention, and desire to secure by Letters Patent, is—

The pulping and disintegrating of shavings of wood and other similar vegetable matter for making paper by treating them with caustic alkali, chlorine, simple or its compound with oxygen, and alkali, in the order substantially as described.

In witness whereof we have hereunto set our signatures this 6th day of January, in the year 1854, in the presence of two subscribing witnesses.

CHARLES WATT.
    HUGH BURGESS.

Witnesses:
 WILLIAM LEWIS,
  8 *St. Albans Terrace, Kensington.*
 JOHN WATT,
  1 *Ampton Street, Gray's Inn Road.*